United States Patent
Jung et al.

(10) Patent No.: US 12,415,443 B2
(45) Date of Patent: Sep. 16, 2025

(54) CONTROL METHOD AND APPARATUS FOR VEHICLE IN BABY MODE

(71) Applicants: Hyundai Motor Company, Seoul (KR); Kia Corporation, Seoul (KR)

(72) Inventors: Sung Il Jung, Busan (KR); Hui Un Son, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 206 days.

(21) Appl. No.: 18/074,927

(22) Filed: Dec. 5, 2022

(65) Prior Publication Data

US 2023/0303104 A1  Sep. 28, 2023

(30) Foreign Application Priority Data

Mar. 24, 2022 (KR) .......................... 10-2022-0036590

(51) Int. Cl.
*B60W 40/08* (2012.01)
*B60N 2/02* (2006.01)
*B60N 2/26* (2006.01)
*B60W 50/14* (2020.01)

(52) U.S. Cl.
CPC .......... *B60N 2/267* (2023.08); *B60N 2/0224* (2013.01); *B60W 40/08* (2013.01); *B60W 50/14* (2013.01); *B60N 2/0268* (2023.08); *B60W 2050/143* (2013.01); *B60W 2050/146* (2013.01); *B60W 2420/54* (2013.01)

(58) Field of Classification Search
CPC ................. B60W 50/14; B60W 40/08; B60W 2050/143; B60W 2050/146; B60W 2420/54; B60N 2/26; B60N 2/0268
See application file for complete search history.

(56) References Cited

U.S. PATENT DOCUMENTS

2022/0161760 A1* 5/2022 Moeller ............... G08B 21/182
2022/0203884 A1* 6/2022 Cech ..................... B60Q 5/005

* cited by examiner

*Primary Examiner* — Kito R Robinson
*Assistant Examiner* — Roy Rhee
(74) *Attorney, Agent, or Firm* — Fox Rothschild LLP

(57) ABSTRACT

Provided is a vehicle driving control method and apparatus based on a baby mode, the method comprising sensing, using a sensing unit, sensing information, the sensing information comprising a physical value corresponding to a current driving state of a vehicle and movement information of an infant on a car seat in the vehicle, updating a driving evaluation score of a driver of the vehicle based on the sensing information, outputting a warning signal to the driver when the driving evaluation score is less than or equal to a threshold value, and, when the warning signal is repeated at least a predetermined number of times, generating a feedback signal configured to adjust a position of the car seat.

14 Claims, 6 Drawing Sheets

Traveling direction

Traveling direction

CONTROL METHOD AND APPARATUS FOR VEHICLE IN BABY MODE

CROSS-REFERENCE TO RELATED APPLICATION(S)

This application claims, under 35 U.S.C. § 119(a), the benefit of Korean Patent Application No. 10-2022-0036590, filed on Mar. 24, 2022, the disclosure of which is incorporated herein by reference in its entirety.

BACKGROUND

Technical Field

Embodiments of the present disclosure relate to a vehicle driving control method and apparatus based on a baby mode.

Background

The amended Road Traffic Act, effective from Sep. 28, 2018, mandates that car seats be installed for children under the age of six on board. A car seat may be a separate device additionally installed on seats provided in a vehicle to prevent people with reduced mobility from having a safety accident that may be caused by a sudden stop or start, or a vehicle collision. In general, a car seat for infants and toddlers, which is a separate protective device for supporting and protecting the body of an infant or toddler while a vehicle is traveling, may be additionally provided on an original seat provided in the vehicle. The car seat for infants and toddlers may be formed as a separate seat independent from the original seat of the vehicle and may be provided to couple and support the car seat and the original seat through a seat belt in the vehicle.

Newborn infants may be exposed to a risk of acquiring shaken baby syndrome (SBS), even by a small impact, due to their high head-to-body weight ratio and weak neck and back muscles yet to be fully developed. Although preventive measures, such as, for example, rear-facing installation of car seats, have been applied to prevent fatal damage to infants and toddlers in the event of a collision, there may still be insufficient technology for the effects of sudden acceleration, sudden braking, and parking impacts of vehicles.

SUMMARY

An object of the present disclosure is to provide a vehicle driving control method and apparatus based on a baby mode that may guide a driver to drive safely.

Another object of the present disclosure is to provide a vehicle driving control method and apparatus based on a baby mode that may prevent an infant or toddler seated on a car seat from being adversely affected.

Still another object of the present disclosure is to provide a vehicle driving control method and apparatus based on a baby mode that may provide information allowing a driver to recognize a position of a car seat desirable for a driving habit of the driver.

Additional advantages, objects, and features of the present disclosure will be set forth in part in the description which follows and in part will become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

In one aspect, a vehicle driving control method is provided, the method comprising: a) sensing, using a sensing unit, sensing information, the sensing information comprising: i) a current driving state of a vehicle; and ii) movement information of a passenger positioned in a vehicle seat in the vehicle; b) updating a driving evaluation score of a driver based on the sensing information; when the driving evaluation score of the driver is less than or equal to a threshold value, outputting a warning signal to the driver; and when the warning signal is repeated at least a predetermined number of times, generating a feedback signal configured to adjust a position of the vehicle seat.

In one aspect, a vehicle driving control method based on a baby mode may comprise receiving, as an input, information associated with whether a vehicle seat (e.g. car or other ground vehicle seat) is mounted as a front-facing or rear-facing state and the number of months of an infant, monitoring the behavior of a vehicle based on physical values that are set in advance based on a position of the vehicle seat (e.g. car or other ground vehicle seat), and displaying a notification and warning to a driver when the vehicle is traveling at a deceleration/acceleration value, a lateral acceleration value, or the like exceeding a set value, or when a head position of the infant is tilted excessively.

According to an exemplary embodiment, there may be provided a vehicle driving control method based on a baby mode, the method comprising: sensing, using a sensing unit, sensing information, the sensing information comprising a physical value corresponding to a current driving state of a vehicle and movement information of an infant; updating a driving evaluation score of a driver based on the sensing information; when the driving evaluation score of the driver is less than or equal to a threshold value, outputting a warning to the driver; and when the warning signal is repeated at least a predetermined number of times, generating a feedback signal configured to adjust a position of a vehicle seat (e.g. car or other ground vehicle seat).

The vehicle driving control method may further comprise: activating the baby mode; and obtaining state information of the vehicle seat and state information of the infant.

The state information of the vehicle seat may comprise position information associated with a tilt angle of the vehicle seat sensed using an ultrasonic sensor.

The state information of the infant may comprise information associated with the number of months of the infant input by the driver and a vehicle seat mounting state defined as a front-facing state or a rear-facing state.

The physical value corresponding to the current driving state of the vehicle may comprise longitudinal/lateral values, acceleration/deceleration values, a pitching value, and a rolling value of the vehicle.

The driving evaluation score of the driver may be updated when a difference obtained by comparing the physical value corresponding to the current driving state and a set reference physical value is out of a predetermined range.

The driving evaluation score may reflect therein a weight that is applied differently depending on a car seat mounting state and a slope state.

The feedback signal may comprise current tilt angle information of the car seat and optimal tilt angle information corresponding to the driving evaluation score of the driver.

The vehicle driving control method may further comprise controlling a tilt angle adjuster provided in the vehicle seat to adjust the position of the car seat to an optimal tilt angle corresponding to the driving evaluation score of the driver.

A control signal may be provided to the tilt angle adjuster through short-range wireless communication.

According to another exemplary embodiment, there may be provided a vehicle driving control apparatus based on a baby mode, the apparatus comprising: an input unit configured to provide state information of a car seat and state information of an infant; a sensing unit configured to sense physical value information corresponding to a current driving state of a vehicle and movement information of the infant; a controller configured to compare a reference value that is set based on the information provided through the input unit and sensing information that is provided by the sensing unit, manage a driving evaluation score of a driver based on a difference value obtained by the comparing, and output information for safe driving; and a display device configured to display guide information to the driver based on a control signal of the controller.

The display device may comprise a video output device configured to display the information for safe driving through any one or more of a head-up display (HUD), a cluster, and a navigation system; and a speaker configured to provide the information for safe driving in voice.

When a vehicle seat (e.g. car or other ground vehicle seat) mounting state is determined to be a front-facing state and a forward head tilt of the infant is sensed by lateral acceleration during deceleration and sudden braking, the controller may increase a weight. When the vehicle seat (e.g. car or other ground vehicle seat) mounting state is determined to be a rear-facing state and a backward head tilt of the infant is sensed by lateral acceleration during acceleration and sudden acceleration, the controller may increase the weight.

When the vehicle seat (e.g. car or other ground vehicle seat) mounting state is determined to be the front-facing state, the controller may increase a weight for sudden braking during downhill driving. When the vehicle seat mounting state is determined to be the rear-facing state, the controller may increase the weight for sudden acceleration during uphill driving.

The information for safe driving may comprise warning information that warns the driver that the driving evaluation score of the driver is less than or equal to a threshold value and a feedback signal that guides the driver to adjust a position of the vehicle seat.

The feedback signal may comprise current tilt angle information of the vehicle seat and optimal tilt angle information corresponding to the driving evaluation score of the driver.

According to exemplary embodiment s described herein, a vehicle driving control method and apparatus based on a baby mode may guide a driver to drive safely so as not to adversely affect an infant or toddler seated on a vehicle seat.

As referred to herein, an infant may be anywhere from 0 or 1 days up to 6 months, 9 months, 12 months, 18 months or 2 years or more. A toddler or child may be older than an infant and up to for example 2, 3, 4, or 5 years or more where the toddler, or child is using a non-standard car seating. References to ages herein are made in U.S.-convention age designations (rather than for example Korean-convention age designations).

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principles of the disclosure. In the drawings.

DETAILED DESCRIPTION

Figure 1:
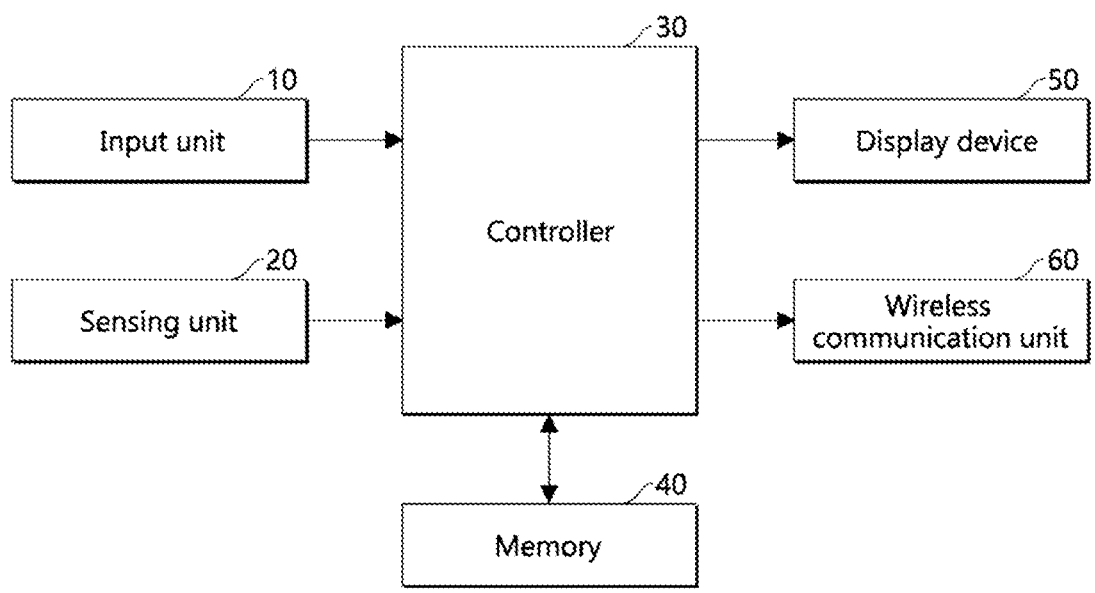
FIG. 1 is a block diagram schematically illustrating a configuration of a vehicle driving control apparatus based on a baby mode according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit a nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some exemplary embodiment s will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure. In addition, a detailed description of well-known features or functions will be ruled out in order not to unnecessarily obscure the gist of the present disclosure.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some exemplary embodiment s will be described in detail with reference to the accompanying drawings. Regarding the reference numerals assigned to the elements in the drawings, it should be noted that the same elements will be designated by the same reference numerals, wherever possible, even though they are shown in different drawings.

Hereinafter, a vehicle driving control apparatus based on a baby mode and a vehicle driving control method using the same will be described with reference to the accompanying drawings.

FIG. 1 is a block diagram schematically illustrating a configuration of a vehicle driving control apparatus based on a baby mode according to an exemplary embodiment. The vehicle driving control apparatus described herein may refer to an apparatus for controlling driving of a vehicle based on a baby mode. According to an exemplary embodiment, the vehicle driving control apparatus may comprise an input unit 10, a sensing unit 20, a controller 30, a memory 40, a display device 50, and a wireless communication unit 60.

A driver of a vehicle may input state information of a car seat and state information of an infant through the input unit 10. The input unit 10 may be implemented through a navigation system comprising a touchscreen, or the like. The input information may comprise information on whether the baby mode is set, the number of months of the infant, and car seat mounting state information. The information on whether the baby mode is set may indicate a switching state that sets whether to implement the vehicle driving control method described herein.

The sensing unit 20 may be configured to sense physical value information associated with a current driving state of the vehicle and movement information of the infant. Physical values in the physical value information associated with the current driving state of the vehicle may comprise lateral/longitudinal values, acceleration/deceleration values, a pitching value, and a rolling value of the vehicle.

The controller 30 may be configured to compare a reference value set based on the information provided through the input unit 10 and sensing information provided from the sensing unit 20, manage a driving evaluation score of the driver based on a difference value obtained by the comparing, and output information for safe driving through the display device 50.

The memory 40 may be configured to store therein the reference value and the driving evaluation score of the driver. The reference value may comprise a pre-calculated acceleration limit value, a vehicle rolling limit value, a vehicle pitching limit value, and a degree of head shaking of the infant. The reference value may vary according to tilt information.

The display device 50 may be configured to display guide information to the driver according to a control signal of the controller 30.

The wireless communication unit 60 may be configured to wirelessly communicate with the car seat through short-range wireless communication which is, for example, Bluetooth communication.

Figure 2A:
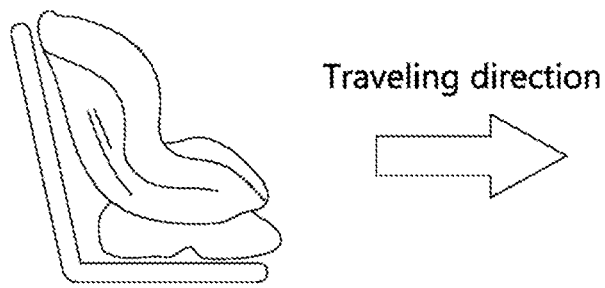
FIGS. 2A and 2B are diagrams illustrating example car seat mounting states.
Figure 2B:
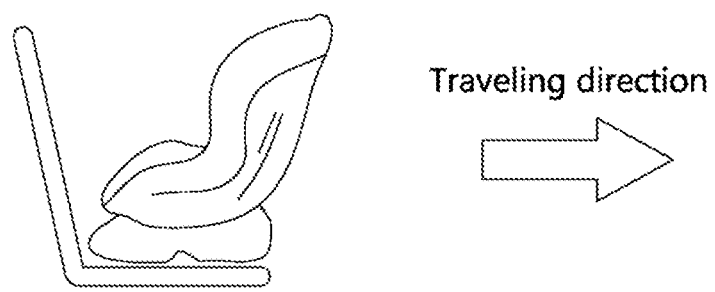

FIGS. 2A and 2B are diagrams illustrating example car seat mounting states. According to an exemplary embodiment, car seat mounting state information may be defined as a front-facing state and a rear-facing state. A state where a car seat is mounted in a direction of an infant facing a vehicle traveling direction is defined herein as the front-facing state, as illustrated in FIG. 2A. A state where a car seat is mounted in a direction of an infant facing an opposite direction of a vehicle traveling direction is defined herein as the rear-facing state, as illustrated in FIG. 2B.

Figure 3:
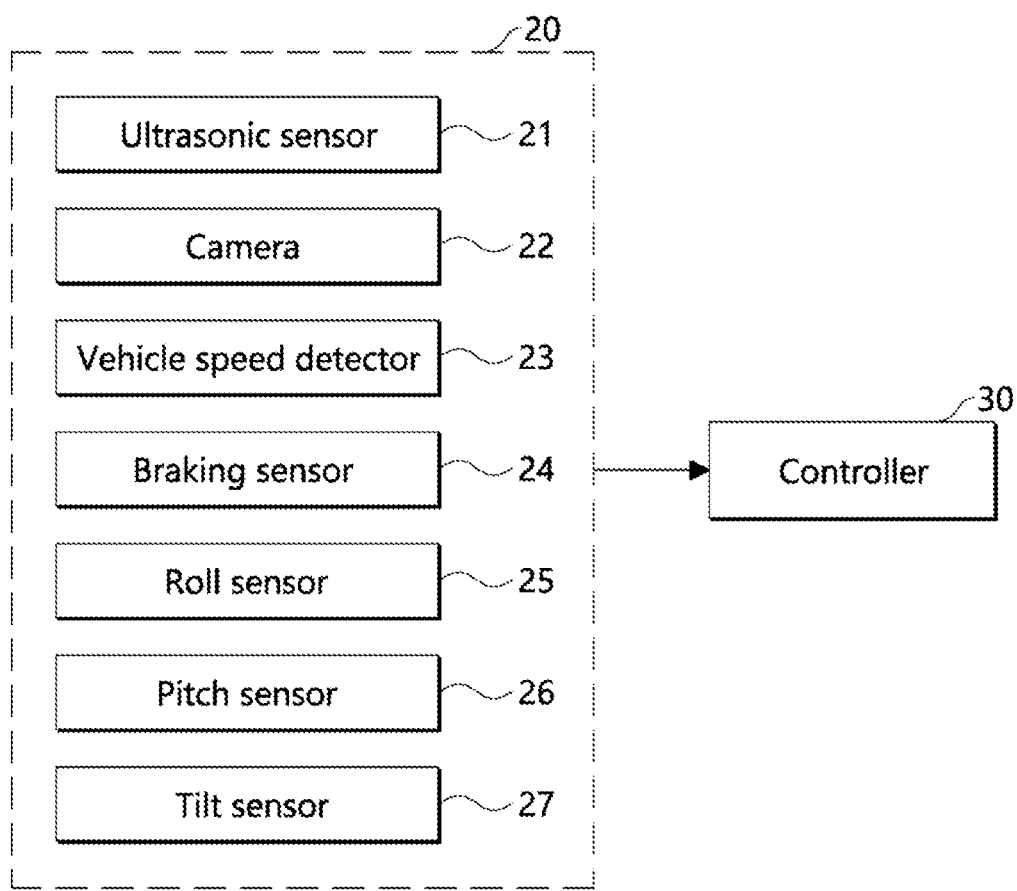
FIG. 3 is a block diagram illustrating a sensing unit of a vehicle driving control apparatus based on a baby mode according to an exemplary embodiment.

FIG. 3 is a block diagram illustrating a sensing unit of a vehicle driving control apparatus based on a baby mode according to an exemplary embodiment. As illustrated, the sensing unit 20 may comprise an ultrasonic sensor 21, a camera 22, a vehicle speed detector 23, a braking sensor 24, a roll sensor 25, a pitch sensor 26, and a tilt sensor 27. Although the vehicle driving control apparatus is illustrated herein as comprising the roll sensor 25, the roll sensor 25 may be selectively applied because the effect of a sharp curve in the left and right directions of the vehicle may be relatively smaller than the effect of sudden acceleration and deceleration on the neck of the infant.

The ultrasonic sensor 21 may be configured to sense position information based on a tilt angle of the car seat, and provide the sensed position information to the controller 30.

The camera 22 may be configured to capture an image of the head of the infant and provide the captured image to the controller 30, and may be configured to perform a monitoring function such that the controller 30 analyzes the image and determines a degree of movement of the head of the infant.

The vehicle speed detector 23, which is connected to a transmission of the vehicle, may be configured to detect a traveling speed of the vehicle while the vehicle is traveling and transmit a result of the detecting to the controller 30.

The braking sensor 24 may be configured to sense the use of a brake pedal while the vehicle is traveling and transmit a result of the sensing to the controller 30.

Figure 4:
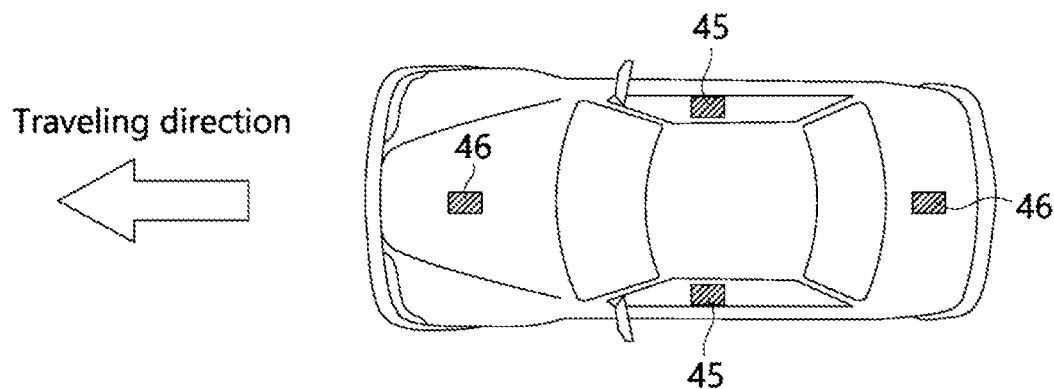
FIG. 4 is a diagram illustrating respective arrangement positions of a roll sensor and a pitch sensor.

The roll sensor 25 may be positioned on the left and right sides of the vehicle as illustrated in FIG. 4 to sense a rolling state of the vehicle and transmit a result of the sensing to the controller 30.

The pitch sensor 26 may be positioned on the front and rear sides of the vehicle as illustrated in FIG. 4 to sense a pitching state of the vehicle and transmit a result of the sensing to the controller 30.

The tilt sensor 27 may be configured to detect a tilt of the vehicle and transmit the detected tilt to the controller 30, and the controller 30 may be configured to determine whether the vehicle is traveling on a flat road, an uphill, or a downhill based on a sensing signal.

Figure 5:
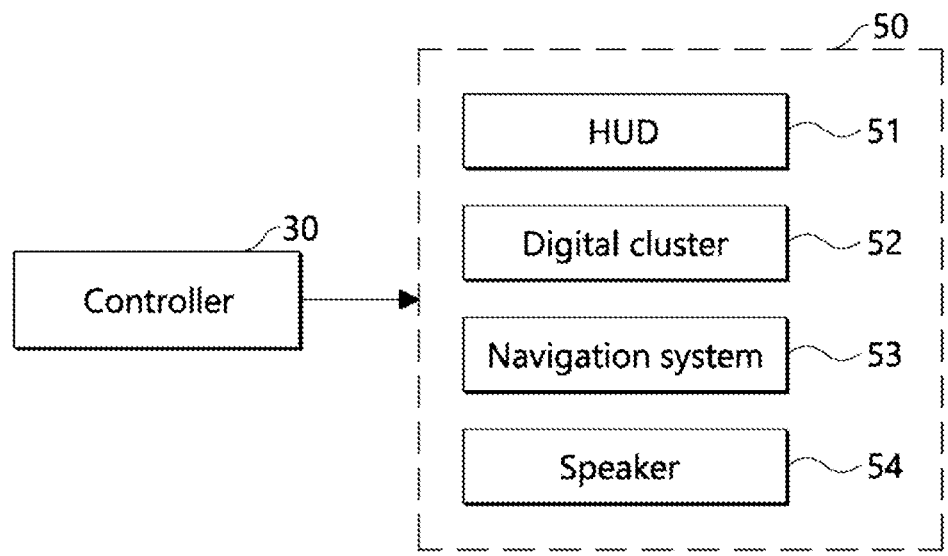
FIG. 5 is a block diagram illustrating a display device of a vehicle driving control apparatus based on baby mode according to an exemplary embodiment.

FIG. 5 is a block diagram illustrating a display device of a vehicle driving control apparatus based on a baby mode according to an exemplary embodiment. The display device 50 may comprise a video output device and an audio output device. The video output device may comprise a head-up display (HUD) 51, a cluster 52, and a navigation system 53, which visually display information to be recognizable by the driver for safe driving. The audio output device may comprise a speaker 54 that provides the information for safe driving in voice.

Figure 6:
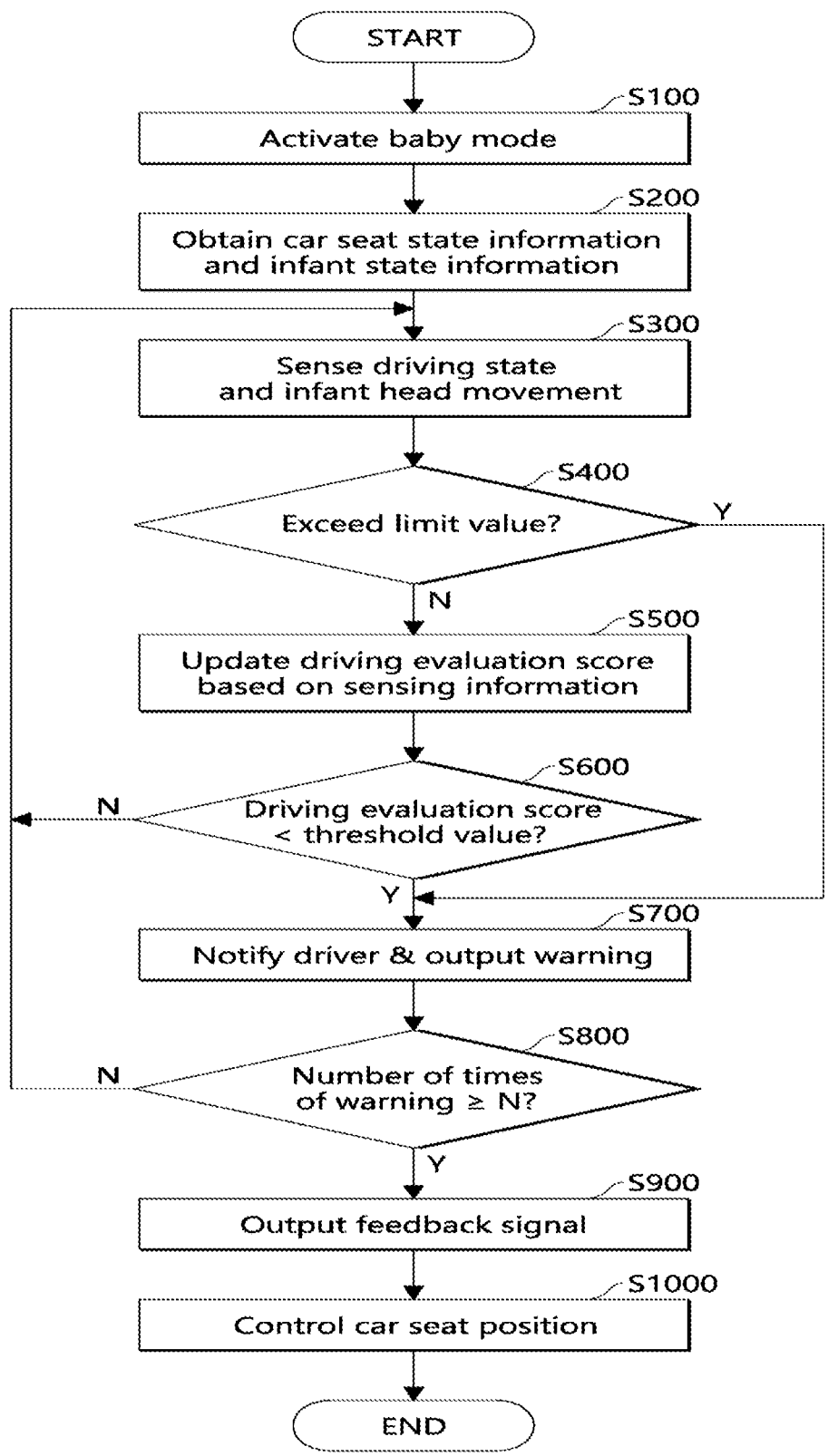
FIG. 6 is a flowchart illustrating a vehicle driving control method based on a baby mode according to an exemplary embodiment.

FIG. 6 is a flowchart illustrating a vehicle driving control method based on a baby mode according to an exemplary embodiment. In the following description, a subject performing each operation may be the controller 30, and operations performed by the controller 30 will be described in detail hereinafter. A program for the operations of the controller 30 may be stored in the memory 40.

A driver of a vehicle may install a car seat in the vehicle and select a baby mode through an input unit provided in the vehicle. The controller 30 may be configured to recognize a mode selection signal and activate the baby mode. (S100)

After the baby mode is activated, state information of an infant may be input through the input unit. That is, the number of months of the infant using the car seat and information on a mounting state of the car seat (hereinafter, car seat mounting state information) that is defined by front-facing installation or rear-facing installation may be input. When the baby mode is activated, an ultrasonic sensor provided in the vehicle may be configured to sense a position according to a tilt angle (or recline angle) of a backrest of the car seat. The information input from the driver and information sensed by the ultrasonic sensor may be transmitted to the controller 30 and stored in the memory 40. (S200)

When the driver starts driving the vehicle, each sensor of the sensing unit 20 may be configured to sense a physical value according to a current driving state of the vehicle and movement information of the infant. For example, respective sensors of the sensing unit 20 may be configured to detect a vehicle speed for determining acceleration and deceleration in longitudinal/lateral directions of the currently traveling vehicle, sense whether a brake is applied, sense rolling or pitching values, and sense head movement information of the infant based on a camera image, or the like. (S300)

The controller 30 may be configured to determine whether a vehicle speed variation and a head movement of the infant are out of limit values based on sensing data of the sensors. A limit value used herein may be a value that is set based on a degree to which a physical effect on the infant becomes a fatal risk to the infant when it is considerably large and repeats. The limit value may be a value that varies according to an infant's age and physical condition. For example, if a longitudinal acceleration value is 0.5 g or greater and the head of the infant moves 30 cm or greater, this may be considered the worst driving situation for the infant. Accordingly, a step of notifying the driver that such a driving habit affects the infant greatly and outputting a warning sound may be performed subsequently. (S400)

However, when the sensing information transmitted from the sensing unit 20 is not out of the limit value, the controller 30 may be configured to evaluate the driving of the driver with a driving evaluation score of the driver based on the sensing information and update the driving evaluation score. That is, the evaluation may be performed in a way that the driving evaluation score of the driver is subtracted when a current driving ability of the driver potentially has a bad effect on the infant seated on the car seat. The evaluation will be described below in greater detail with reference to FIG. 7. (S500)

The controller 30 may be configured to determine whether a current driving evaluation score of the driver stored in the memory 40 is less than a threshold value. The threshold value may be a value set to prevent an adverse effect on the body of the infant at a current position by the tilt angle of the car seat. (S600)

When the driving evaluation score of the driver is gradually lowered to be less than or equal to the threshold value, the controller 30 may be configured to control the display device 50 to display a warning to the driver therethrough. That is, the display device 50 may be configured to display a notification and warning information on a potential effect of a current driving state on the infant through a video output from a HUD, a cluster, or a navigation system, and through an audio output from a speaker. (S700)

The controller 30 may be configured to determine whether the number of times of the notification and warning exceeds a predetermined number (N). The number of times of the warning may be accumulated and stored in the memory 40. The number N of times may be set in advance. (S800)

When the warning is repeated by the number of times that exceeds the predetermined number N of times, the controller 30 may be configured to generate a feedback signal for adjusting the position of the car seat. The feedback signal may comprise current tilt angle information of the car seat and optimal tilt angle information corresponding to the driving evaluation score of the driver. The position of the car seat by the tilt angle of the car seat may be a factor that has a great effect on vertical and horizontal tilts of the head of the infant. For example, if the driving of the driver continues to affect the infant at an initially set position of the car seat, feedback may be provided. Accordingly, the driver may be guided to set a position of the car seat that may minimize a potential influence of the current driving of the driver on the infant. (S900)

If the car seat has a tilt angle adjuster that operates by an electronic control signal, the controller 30 may be configured to control the tilt angle adjuster provided in the car seat to adjust the position of the car seat to the optimal tilt angle corresponding to the driving evaluation score of the driver. In this case, a control signal for adjusting the tilt angle of the car seat may be transmitted via the wireless communication unit 60 through Bluetooth. (S1000)

Figure 7:
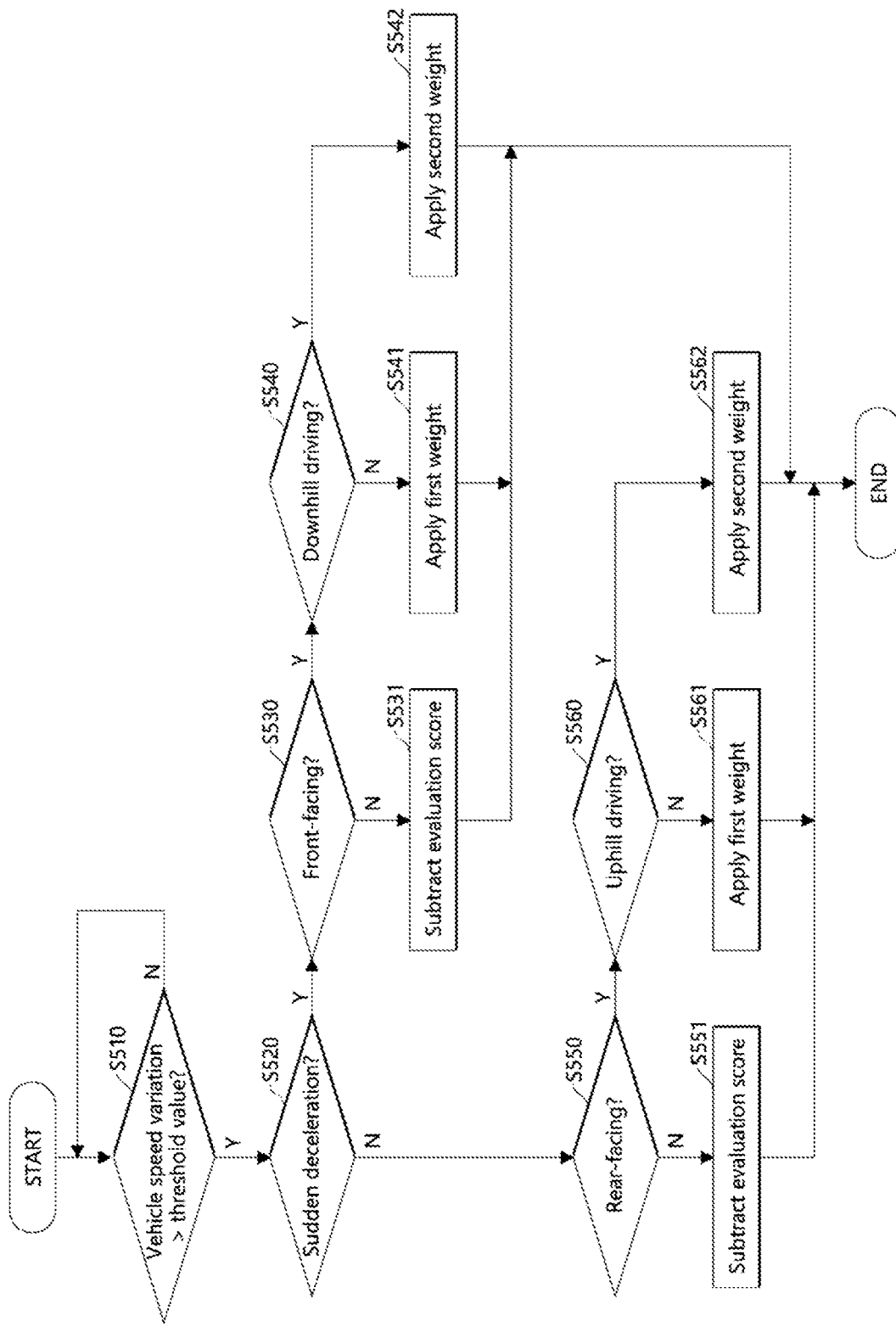
FIG. 7 is a flowchart illustrating a flow of detailed operations in a driving evaluation score updating step of FIG. 6.

FIG. 7 is a flowchart illustrating a flow of detailed operations in a driving evaluation score updating step of FIG. 6. As described above, an effect of a rolling motion of a vehicle on an infant may be relatively smaller than an effect of sudden acceleration or deceleration on the infant or a pitching motion of the vehicle on the infant. The operations to be described hereinafter may be based mainly on sudden acceleration and sudden deceleration.

The camera 22 may be configured to capture an image of the head of the infant in real time, and the controller 30 may be configured to calculate a movement of the head of the infant based on the image. However, such a movement may be from the will of the infant to move, not necessarily from the driving of the driver, and thus the controller 30 may be configured to determine the movement based on physical values related to a driving state.

The controller 30 may be configured to determine whether a vehicle speed variation by sudden acceleration or deceleration is out of a threshold value based on sensing information of the vehicle speed detector 23 and the braking sensor 24 (S510).

The controller 30 may be configured to determine whether a result of the determining on the vehicle speed variation corresponds to sudden deceleration (S520). When it is sudden deceleration, the controller 30 may be configured to determine whether a current car seat mounting state is set to a front-facing state (S530), and subsequently determine whether the vehicle is traveling on a flat ground, a downhill, or an uphill based on a sensing result of the tilt sensor 27 of the vehicle.

When it is sudden deceleration but the current car seat mounting state is set to a rear-facing state, an influence on the head of the infant may be reduced by a headrest. Accordingly, the evaluation score may be subtracted by a basic score (S531). In a case in which it is sudden deceleration and the current car seat mounting state is set to the front-facing state, but the vehicle is traveling on the flat ground or uphill, a first weight may be applied. The first weight may be a value greater than a basic subtraction index. In some cases, the flat ground driving and the uphill driving may be differentiated (S541).

For example, if sudden deceleration occurs during the downhill driving while the car seat is mounted in the front-facing state, the infant may be greatly affected thereby. Accordingly, in this case, a second weight, which is subtracted by a greater index than the first weight, may be applied (S542).

When the vehicle speed variation is out of the threshold value but it is not sudden deceleration, it may indicate sudden acceleration. At sudden acceleration, the controller 30 may be configured to determine whether the current car seat mounting state is set to the rear-facing state (S550), and subsequently determine whether the vehicle is traveling on a flat ground, a downhill, or an uphill based on the sensing result of the tilt sensor 27 of the vehicle (S560).

When it is sudden acceleration but the current car seat mounting state is set to the front-facing state, an influence on the head of the infant may be reduced by the headrest. Accordingly, the evaluation score may be subtracted by the basic score (S551). In a case in which it is sudden acceleration and the current car seat mounting state is set to the rear-facing state, but the vehicle is traveling on the flat ground or downhill, the first weight may be applied. In some cases, the flat ground driving and the downhill driving may be differentiated (S561).

For example, if sudden acceleration occurs during the uphill driving while the car seat is mounted in the rear-facing state, the infant may be greatly affected thereby. Accordingly, in this case, the second weight, which is subtracted by a greater index than the first weight, may be applied. The second weight may be set to a value greater than the first weight (S562).

As described above, information on whether a car seat is mounted in a front-facing or rear-facing state and the number of months of an infant may be input, and the behavior of a vehicle may be monitored based on a physical value that is set in advance based on a set position of the car seat. In this case, if a driver drives the vehicle while exceeding a set acceleration/deceleration, lateral acceleration, and the like, or if a position of the head of the infant is excessively tilted, a notification or warning may be displayed to the driver to guide the driver (or a protector of the infant) to drive safely without adversely affecting the infant.

Although some exemplary embodiments have been shown and described, the present disclosure is not limited to the described exemplary embodiments. Instead, it would be appreciated by those skilled in the art that changes may be made to these exemplary embodiment s without departing from the principles and spirit of the disclosure, the scope of which is defined by the claims and their equivalents.

What is claimed is:

1. A vehicle driving control method, comprising:
   activating, by a navigation system provided in a vehicle, a baby mode of the vehicle in response to driver input, wherein the navigation system comprises a touchscreen;
   receiving, via the touchscreen, state information of a vehicle seat and state information of an infant positioned in the vehicle seat in the vehicle;
   sensing, using a sensing unit, sensing information comprising:
      a physical value corresponding to a current driving state of the vehicle; and
      movement information of a head of the infant positioned in the vehicle seat;
   determining, using a controller, whether a vehicle speed variation and a sensed value of a head movement of the infant exceed limit values based on the physical value corresponding to the current driving state; and
   outputting, using the controller, a warning signal to the driver when the vehicle speed variation and the sensed value of the head movement of the infant exceed the limit values; and
   when the warning signal is repeated at least a predetermined number of times, generating using the controller, a feedback signal configured to adjust a position of the vehicle seat;
   wherein the warning signal is output through a video output including a head-up display (HUD), a cluster, or the navigation system and through an audio output from a speaker.

2. The vehicle driving control method of claim 1, wherein the state information of the vehicle seat comprises position information associated with a tilt angle of the vehicle seat sensed using an ultrasonic sensor.

3. The vehicle driving control method of claim 1, wherein the state information of the infant comprises information associated with:
   a number of months of an age of the infant, input by the driver; and
   a vehicle seat mounting state defined as a front-facing state or a rear-facing state.

4. The vehicle driving control method of claim 1, wherein the physical values corresponding to the current driving state of the vehicle comprise one or more of the following values of the vehicle:
   longitudinal values;
   lateral values;
   acceleration values;
   deceleration values;
   pitching values; and
   rolling values.

5. The vehicle driving control method of claim 2, further comprising, when the limit values are not exceeded:
   updating a driving evaluation score of a driver based on the sensing information; and
   when the driving evaluation score is less than or equal to a threshold value, outputting the warning signal to the driver;
   wherein the driving evaluation score reflects therein a weight that is applied differently depending on the state of the vehicle seat mounting state and the tilt angle of the vehicle seat.

6. The vehicle driving control method of claim 1, wherein the feedback signal comprises:
   current tilt angle information of the vehicle seat; and
   optimal tilt angle information corresponding to the driving evaluation score of the driver.

7. The vehicle driving control method of claim 6, further comprising:
   controlling, using the controller, a tilt angle adjuster provided in the vehicle seat to adjust the position of the vehicle seat to an optimal tilt angle corresponding to the driving evaluation score of the driver.

8. The vehicle driving control method of claim 7, further comprising providing a control signal, using the controller, to the tilt angle adjuster through short-range wireless communication.

9. The vehicle driving control method of claim 8, wherein the short-range wireless communication comprises Bluetooth communication.

10. A vehicle driving control apparatus based on a baby mode, comprising:
    an input unit configured to receive information comprising state information of a vehicle seat and state information of an infant positioned in a vehicle seat in a vehicle;
    a sensing unit configured to sense sensing information comprising a current driving state information of the vehicle and movement information of the infant;
    a controller configured to:
       compare a reference value that is set based on the information provided through the input unit with a sensing value based on the sensing information that is provided by the sensing unit;
       manage a driving evaluation score of a driver based on a difference value obtained by comparing the reference value and the sensing value; and
       output information for safe driving;
    an information output device configured to output guide information to the driver based on a control signal of the controller; and
    a memory configured to store therein the reference value and the driving evaluation score of the driver;
    wherein the sensing unit comprises:
       an ultrasonic sensor configured to sense position information associated with a tilt angle of the vehicle seat;
       a camera configured to monitor a head movement of the infant;
       a vehicle speed detector configured to detect a traveling speed of the vehicle;
       a braking sensor configured to sense the use of a brake pedal during driving of the vehicle;
       a roll sensor positioned on left and right sides of the vehicle and configured to sense a rolling state of the vehicle;
       a pitch sensor positioned on front and rear sides of the vehicle and configured to sense a pitching state of the vehicle; and
       a tilt sensor configured to sense a tilt of the vehicle.

11. The vehicle driving control apparatus of claim 10, wherein the current driving state information of the vehicle comprises one or more of the following values of the vehicle:
    longitudinal values;
    lateral values;
    acceleration values;
    deceleration values;
    pitching values; and
    rolling values.

12. The vehicle driving control apparatus of claim 10, wherein the state information of the infant comprises:
- information associated with a number of months of age of the infant input through the input unit; and
- a vehicle seat mounting state defined as a front-facing state or a rear-facing state.

13. The vehicle driving control apparatus of claim 12, wherein the controller is configured to reflect, in the driving evaluation score of the driver, a weight to be applied differently depending on the vehicle seat mounting state and the tilt angle of the vehicle seat.

14. The vehicle driving control apparatus of claim 13, wherein the controller is configured to:
- increase the weight when the vehicle seat mounting state is determined to be the front-facing state and a forward head tilt of the infant is sensed by lateral acceleration during deceleration and sudden braking; and
- increase the weight when the vehicle seat mounting state is determined to be the rear-facing state and a backward head tilt of the infant is sensed by lateral acceleration during acceleration and sudden acceleration;
and/or wherein the controller is configured to:
- increase the weight for sudden braking during downhill driving when the vehicle seat mounting state is determined to be the front-facing state; and
- increase the weight for sudden acceleration during uphill driving when the vehicle seat mounting state is determined to be the rear-facing state;

wherein the controller is configured to:
- determine whether a vehicle speed variation and a head movement of the infant exceed limit values based on the sensing information provided by the sensing unit; and
- perform control to manage the driving evaluation score of the driver or output a warning to the driver based on a result of the determining;

and/or
wherein the information output device comprises:
- a video output device configured to display the information for safe driving through one or more of the following: a head-up display (HUD); a cluster; and a navigation system; and
- a speaker configured to provide the information for safe driving in voice;

and/or
wherein the information for safe driving comprises:
- warning information configured to warn the driver that the driving evaluation score of the driver is less than or equal to a threshold value; and
- a feedback signal configured to guide the driver to adjust a position of the car optionally wherein the feedback signal comprises current tilt angle information of the vehicle seat and optimal tilt angle information corresponding to the driving evaluation score of the driver;

and/or
wherein the vehicle seat comprises a tilt angle adjuster configured to adjust a tilt angle through electronic control;

and/or
wherein the controller is configured to:
output, through a wireless communication unit, a control signal configured to adjust a position of the vehicle seat to be at an optimal tilt angle corresponding to the driving evaluation score of the driver, optionally wherein the wireless communication unit is configured to communicate with the vehicle seat through Bluetooth communication, and/or optionally the memory comprises product information of the vehicle seat.

* * * * *